(12) United States Patent
Schmidt

(10) Patent No.: US 6,352,641 B1
(45) Date of Patent: Mar. 5, 2002

(54) WOUND POCKET MODULE

(75) Inventor: Hans-Weddo Schmidt, Hardegesen (DE)

(73) Assignee: Sartorius AG (DE)

( * ) Notice: Subject to any disclaimer, the term of this patent is extended or adjusted under 35 U.S.C. 154(b) by 0 days.

(21) Appl. No.: 09/591,868

(22) Filed: Jun. 12, 2000

(30) Foreign Application Priority Data

Oct. 24, 1997 (DE) .......................................... 197 47 004

(51) Int. Cl.⁷ ............................................. B01D 63/10
(52) U.S. Cl. ........................... 210/321.83; 210/321.74; 210/484; 210/488; 210/493.4
(58) Field of Search ................. 210/321.61, 321.74, 210/321.76, 321.78, 321.83, 321.85, 321.87, 484, 488, 493.4

(56) References Cited

U.S. PATENT DOCUMENTS

| | | | | |
|---|---|---|---|---|
| 4,842,736 A | | 6/1989 | Bray et al. | 210/321.74 |
| 5,096,584 A | * | 3/1992 | Reddy et al. | 210/321.74 |
| 5,275,726 A | | 1/1994 | Feimer et al. | 210/321.74 |
| 5,538,642 A | * | 7/1996 | Solie | 210/321.83 |

FOREIGN PATENT DOCUMENTS

EP 0486190 A2 * 5/1992

* cited by examiner

*Primary Examiner*—John Kim
(74) *Attorney, Agent, or Firm*—Chernoff, Vilhauer, McClung & Stenzel, LLP

(57) ABSTRACT

An improvement to a spiral wound filtration membrane is the provision of a fluid-permeable protective sheath around the inner spacer of the membrane pocket.

8 Claims, 2 Drawing Sheets

WOUND POCKET MODULE

The priority continuation of PCT/EP 98/06589 filed Oct. 17, 1998 and DE 19747 004.1 filed Oct. 24, 1997 is claimed pursuant to 35 USC §§120 and 365(b).

BACKGROUND OF THE INVENTION

Spiral wound filter modules are useful for filtration processes in the food and beverage industries, in pharmaceutical and chemical manufacturing plants as well as in laboratories. They also are used in environmental protection applications and in the bio-tech industries. In these applications the emphasis is on the separation of fluid or particle components such as proteins, microorganisms, cells and the like, as well as in prevention of contamination of the fluids that are filtered.

Such spiral wound modules are typically enclosed in a housing provided with fluid connections. The winding consists of at least one membrane envelope or pocket with an inner spacer and at least one outer spacer arranged so as to form fluid channels for the flow of permeate, feed and/or retentate. These components are wound in spiral fashion about a fluid-permeable core tube so that at least one membrane envelope or pocket is in fluid communication with the core tube by means of an inner spacer and holes in the core tube. See, for example, U.S. Pat. No. 5,275,726. Depending upon the arrangement of the fluid connections, such wound modules can be operated in either a cross-flow or dead-end filtration mode. The winding can also be from cut sections of flat membranes with interposed, spirally wound, laminar spacers, wherein the spacers also form channels for permeate, feed and/or retentate. Fluid channels are fabricated by sealing corresponding, neighboring flat membranes fluid-tight to membrane pockets in their side zones.

In the operation of such spiral wound modules, the membranes are subjected to strong mechanical forces. Mechanical stresses appear predominately in the areas of folded ends of the membrane pockets, particularly in the closed area of the front end of the membrane pocket, which is proximal to the core tube. In this area, membrane defects often occur, rendering the entire spiral wound module unusable. Damage to the membranes in this area also occurs by virtue of flexing arising from the membranes being pressed into and out of open spaces found in the interstices of reinforcing fabrics, textiles, or lattice work.

To remedy such problems it is known to apply an adhesive to reinforce the membranes in the inner area of the folded end of the membrane pocket, or, as taught in U.S. Pat. No. 4,842,736, to introduce an easily meltable thermoplastic material onto the outside of the folded end and allowing it to penetrate so as to reinforce the membrane by completely filling the pores of the membrane in the area of reinforcement.

Another approach is disclosed in EP 0 486 190 A2, which discloses the application of a thick film of a thermoplastic material to the outer area of the folded end of the membrane pocket of an integrally reinforced membrane; the application of heat and pressure causes the thick film to be bound both to the reinforcement and to the membrane. But such a reinforcement technique has a considerable drawback in that the pores of the membrane resist the passage of fluid, thereby diminishing the filtration efficiency of the membrane and as a result the overall filtration capacity of the spiral wound module. Furthermore, in the case of hydrophilic membranes, hydrophobicity develops in the edges of the area of the hot melt of the thermoplastic material, with the result that the module cannot be tested for integrity when pressurized by test gases.

Other disadvantages of the use of adhesives and thermoplastic materials are that neighboring seams of the membrane pockets may be dissolved by other polymers, sometimes causing seam failures, which in turn permit contaminating material to be drawn in.

Thus, it is a principal object of the present invention to provide a spiral wound module in which the membranes of the membrane pockets of the winding are sufficiently protected against mechanical stresses that the module provides high filtration capacity and filtration safety.

BRIEF SUMMARY OF THE INVENTION

The foregoing object is achieved by the provision of a spiral wound module wherein the inner spacer inside the membrane envelope or pocket is covered over by a flat, fluid-permeable protective material. This protective covering preferably extends over the entire length of the membrane pocket including the portion of the membrane pocket that is proximal to the core tube.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

Figure 1:
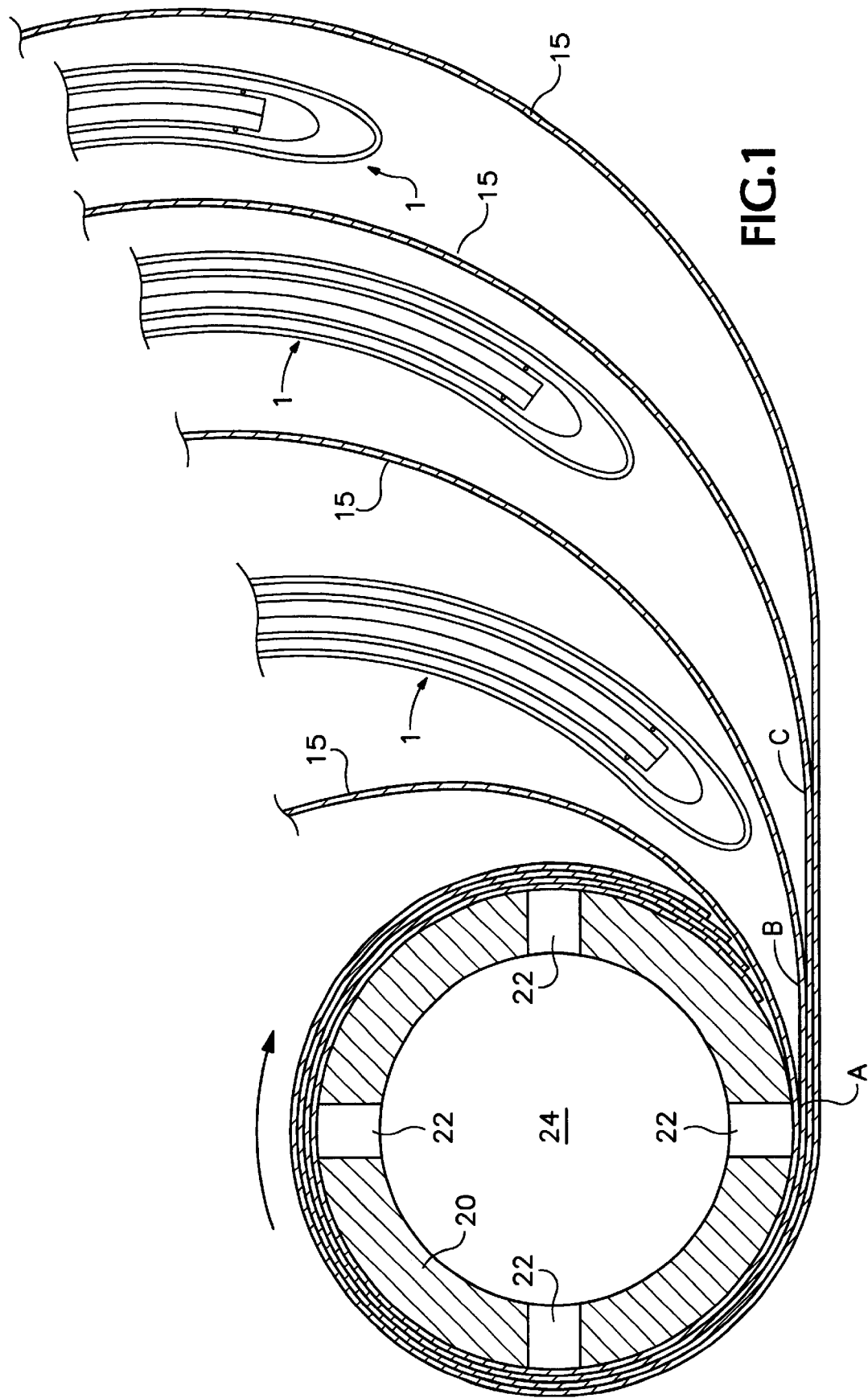
FIG. 1 is a cross-sectional schematic of a spiral wound membrane module comprising a series of membrane pockets would around a core tube.

FIG. 1 shows a series of the terminal ends of membrane pockets 1 separated by permeate spacers 15 wound about central core tube 20 in the general direction shown by the arrow, each pocket 1 being in fluid communication with the central permeate plenum 24 via permeable permeate spacers 15 and axial holes 22. Permeate spacers 15 serve also to isolate membrane pockets 1 from each other by reason of their adherence to neighboring permeate spacers at, for example, A, B and C.

Figure 2:
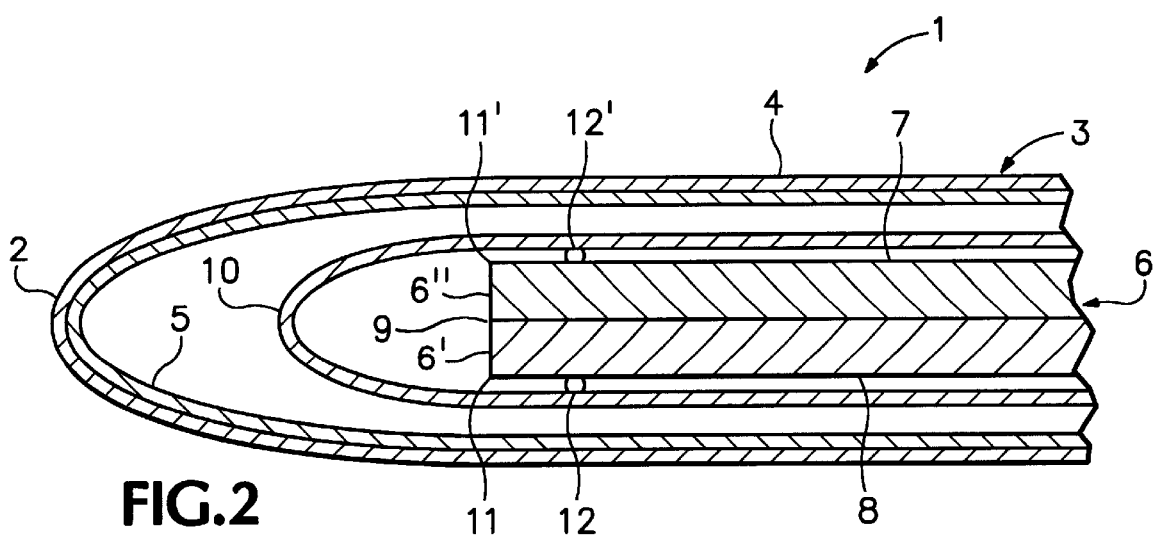
FIG. 2 is an enlarged cross-sectional schematic of the inventive pocket portion of the spiral wound membrane module of FIG. 1.

FIG. 2 shows a membrane pocket 1 in greater detail in the area of its closed end or terminus 2. The membrane pocket comprises a flat section of a composite supported membrane 3, wherein the support 4 is directed toward the outside, and wherein the permselective membrane 5 is proximal to two-layer feed/retentate spacer 6. Spacer 6 comprises two congruent spacers 6' and 6" lying one on the other. Spacer 6 is covered on both sides 7 and 8 over its entire breadth, by a flat, fluid-permeable protective sheath 10 in the area of its front side 9 which is proximal to the terminus 2 of the membrane pocket 1. Protective sheath 10 is preferably of nonwoven fibers and extends 1 to 3 cm beyond the area of the front side 9 and from the edges 11 and 11' of front side 9. Protective sheath 10 is affixed to spacer 6 at points 12 and 12' preferably by ultrasonic spot welding or by glue, whereby its orientation is secured during fabrication of the membrane pocket and during operation of the wound module. Protective sheath 10 is preferably bent into a rounded or U-shape so as to cover the area of the front end 9 of inner spacer 6, and is maintained at a distance of up to 1 cm away from terminus 2 of the membrane pocket.

Spacers 6 are comprised of fiber fabrics, knit-like material, open materials or films. Such spacers are custom-made from such materials and cut or die-stamped to fit, thereby causing sharp or jagged edges 11 and 11' and protruding fibers, which could lead to damage of unprotected delicate membrane 5. Upon application of the required pressure differential for filtration, the fluid-permeable protective sheath 10 in the first instance prevents the membranes from being pressed into the contours, meshes, or large pores of the inner spacer 6. Another problem that is overcome is abrasion of the delicate permselective membrane 5 that would otherwise be caused by rubbing of the membrane against the edges 11 and 11' of the front end of the inner spacer 6. Protective sheath 10 also prevents injury to the seams of the membrane pocket, especially if the closed end of the membrane pocket is made by gluing or by welding. Because protective sheath 10 preferably extends over the entire length of the inner spacer it provides an additional advantage, particularly in the case of windings of multiple membrane pockets, of facilitating a uniform winding.

Another advantage of covering inner spacer 6 with protective sheath 10 is that, even if membrane 5 is pressed onto the inner spacer in the terminus area 2 upon application of pressure during filtration, the membrane will not be kinked. Because of the presence of the protective sheath, the thickness of inner spacer 6 can be increased to about twice that of the protective sheath, whereby the membranes 5 in the area of the terminus 2 of the membrane pocket remain rounded into a U-shape, thereby avoiding V-shapes or the sharp edges of kinks, which can easily lead to membrane defects during the operation of the wound module. In general to avoid kinks in the membrane 5, the thickness of spacer 6 should be greater than the thickness of the membrane 5. Preferably spacer 6 should exhibit a thickness of 400 to 1200 $\mu$m, while the membrane itself may have a thickness of 200 $\mu$m. Most preferably, spacer 6 comprises multiple layers, particularly when two congruent nonwoven fibers are laminated together, each having a thickness of 300 $\mu$m. In a particularly preferred embodiment of the invention, a distance up to 1 cm, preferably up to 0.5 cm, is provided between the front end 9 of spacer 6 and the terminus 2 of the membrane pocket. By providing such spacing, impacts of spacer 6 against terminus 2 are minimized or avoided altogether.

In a preferred embodiment of the present invention, protective sheath 10 extends beyond the area of the front end of spacer 6 and overlaps the edges of this area along both sides of spacer 6, generally by 1 to 3 cm, preferably 2 cm. This embodiment is particulary favorable when the winding is made out of a few, or just one membrane pocket.

When materials are employed for the protective sheath 10 which have a lower filtration resistance than do the membranes of the membrane pockets, the filtration capacity of the spiral wound module is not even slightly diminished. If the protective sheath 10 does not extend over the entire length of the spacer 6, then the danger exists that the protective sheath can rupture during either manufacture or operation of the module. In order to avoid this, in a preferred embodiment of the invention, protective sheath 10 should be at least tack-welded to inner spacer 6, readily accomplished by the application of heat, especially if nonwoven fibers are used for the protective sheath 10 and woven thermoplastic fibers are used as the inner spacer 6. Such an affixing of protective sheath 10 to spacer 6 provides the advantage that those surfaces of the membrane which are filtration-active are not damaged and thus not diminished in filtration capacity. That was not the case, however, when such protective material was affixed to the membrane 5 instead of to inner spacer 6. Asymmetric membranes, which are most commonly used in spiral wound modules, are especially sensitive. Such asymmetric membranes comprise a permselective small-pore "skinned" layer on larger pore support layer. The fixation of the protective materials to the "skinned" side of membranes of this type easily leads to a separation of the permselective skin layer from the support layer of the membrane, rendering it unusable.

Because the present invention avoids any impact on the membrane that would otherwise be caused by temperature or by hot melts, spiral wound modules of hydrophilic membranes can be readily tested for integrity by the use of pressurized gas. Such integrity tests are used to test burst pressures, rates of diffusion, and pressure retaining capacity. This advantage is of considerable importance in sensitive applications, especially where sterile filtration or the recovery of valuable materials are concerned.

For the spiral wound module of the present invention, membranes of organic polymers are employed, which are particularly well-adapted for reverse osmosis, pervaporation, ultrafiltration, microfiltration and membrane chromatography. Because of their mechanical sensitivity, the membranes are preferably used in the form of composite, textile-reinforced membranes. In such applications laminated membranes, especially membranes of nonwoven fibers and in particular nonwovens comprised of core-mantel fibers, are particularly suitable. Where such textile-reinforced membranes are used, the membrane side 5 is proximal to spacer 6.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. In a spiral wound filtration module comprising a winding of at least one membrane pocket comprising a filtration membrane and an inner spacer and at least one outer spacer with said spacers forming fluid channels for the flow of feed, permeate and retentate, said at least one membrane pocket being wound around a core tube and in fluid communication with said core tube, the improvement comprising a flat fluid-permeable protective sheath around the end of and along the length of the inner spacer of said at least one membrane pocket.

2. The filtration module of claim 1 wherein said protective sheath is rounded in the area of said at least one membrane pocket that is proximal to said core tube.

3. The filtration module of claim 1 wherein said protective sheath is affixed to said inner spacer at at least two points on a portion of said inner spacer that is proximal to said core tube.

4. The filtration module of claim 1 wherein said protective sheath has a lower filtration resistance than that of the filtration membrane of said at least one membrane pocket.

5. The filtration module of claim 1 wherein said protective sheath comprises nonwoven fibers.

6. The filtration module of claim 1 wherein said at least one membrane pocket comprises a reinforced membrane having a permselective membrane side and a textile support side.

7. The filtration module of claim 6 wherein the permselective membrane side of said reinforced membrane is proximal to said inner spacer.

8. The filtration module of claim 1 wherein the thickness of said inner spacer is greater than that of said filtration membrane.

* * * * *